US009527171B2

(12) United States Patent
Clark

(10) Patent No.: US 9,527,171 B2
(45) Date of Patent: Dec. 27, 2016

(54) METHOD AND APPARATUS FOR INSTALLING AND REMOVING A FLOW RESTRICTOR FROM A DIFFERENTIAL PRESSURE MEASUREMENT DEVICE

(71) Applicant: Derold Clark, Sylvan Lake (CA)

(72) Inventor: Derold Clark, Sylvan Lake (CA)

( * ) Notice: Subject to any disclaimer, the term of this patent is extended or adjusted under 35 U.S.C. 154(b) by 0 days.

(21) Appl. No.: 14/760,495

(22) PCT Filed: Feb. 15, 2013

(86) PCT No.: PCT/CA2013/050117
§ 371 (c)(1),
(2) Date: Jul. 13, 2015

(87) PCT Pub. No.: WO2014/124514
PCT Pub. Date: Aug. 21, 2014

(65) Prior Publication Data
US 2015/0352674 A1  Dec. 10, 2015

(51) Int. Cl.
*B23P 17/04* (2006.01)
*G01F 1/42* (2006.01)
*G01L 13/00* (2006.01)

(52) U.S. Cl.
CPC ............... *B23P 17/04* (2013.01); *G01F 1/42* (2013.01); *G01L 13/00* (2013.01); *Y10T 137/0491* (2015.04); *Y10T 137/6113* (2015.04)

(58) Field of Classification Search
CPC ............ G01F 1/42; B23P 17/04; G01L 13/00; Y10T 137/6113; Y10T 137/0491
See application file for complete search history.

(56) References Cited

U.S. PATENT DOCUMENTS 1,938,460 A   12/1933  Muff
4,193,574 A    3/1980  Barnes et al.
(Continued)

FOREIGN PATENT DOCUMENTS

CA   1174658 A1   9/1984
CA   2810121 A1   9/2012
(Continued)

OTHER PUBLICATIONS

Singaporean Office Action issued in corresponding Singaporean Patent Application No. 11201505476S dated May 25, 2016.

*Primary Examiner* — Craig Schneider
*Assistant Examiner* — Kevin Barss
(74) *Attorney, Agent, or Firm* — Davis & Bujold PLLC; Michael J. Bujold

(57) ABSTRACT

An apparatus for installing and removing a flow restrictor from a differential pressure measurement device with a seal housing attached to the differential measurement device. The seal housing being sealed to the fitting opening and having a channel connecting the fitting opening and a housing opening. The seal housing has first, second and third seals spaced along the channel. The distance between the first and third seals is greater than the height of the flow restrictor. The first, second and third seals are retractable between an extended, sealing position and a retracted, open position. At least one bleeder valve is positioned between the first and third seals for equalizing pressure between the channel and an external pressure. A series of rotating drivers are spaced along the channel and move the flow restrictor along the channel between the receptacle in the fitting and the housing opening of the seal housing.

23 Claims, 7 Drawing Sheets

(56) References Cited

U.S. PATENT DOCUMENTS

| | | | |
|---|---|---|---|
| 4,275,763 A | 6/1981 | Fahrig |
| 4,412,671 A | 11/1983 | Tiefenthaler |
| 4,425,806 A | 1/1984 | Van Scoy |
| 4,476,730 A | 10/1984 | Brumm |
| 4,785,844 A | 11/1988 | Pankov |
| 5,094,270 A | 3/1992 | Reimert |
| 5,474,103 A | 12/1995 | Klak |
| 5,778,933 A | 7/1998 | Crane |
| 5,836,356 A | 11/1998 | Desai |
| 6,170,521 B1 | 1/2001 | Rohr et al. |
| 6,354,568 B1 | 3/2002 | Carruthers |
| 7,063,107 B2 | 6/2006 | Loga |
| 2004/0016463 A1 | 1/2004 | Shillito |
| 2007/0186987 A1 | 8/2007 | Loga et al. |
| 2013/0180614 A1 | 7/2013 | Pila Gonzalez et al. |

FOREIGN PATENT DOCUMENTS

| | | |
|---|---|---|
| CN | 2380765 Y | 5/2000 |
| EP | 0092910 A1 | 11/1983 |
| EP | 2657660 A1 | 10/2013 |
| FR | 2470326 A1 | 5/1981 |
| WO | 2012120158 A1 | 9/2012 |

METHOD AND APPARATUS FOR INSTALLING AND REMOVING A FLOW RESTRICTOR FROM A DIFFERENTIAL PRESSURE MEASUREMENT DEVICE

TECHNICAL FIELD

This relates to an orifice fitting having a double block and bleed.

BACKGROUND

Orifices plates are often used in flow lines to create a differential pressure, which is measured and used to calculate the flow rate through the pipeline. When removing the orifice plate from the flow line, care must be taken when the flow line is pressurized. Patent publication no. WO2012/120158 (Pila Gonzalez et al.) entitled "Double Closure For Double-Chamber Differential Pressure Measurement Device" describes a device intended to allow the plate to be removed without interrupting flow through the flow line.

SUMMARY

There is provided an apparatus for installing and removing a flow restrictor from a differential pressure measurement device, the differential pressure measurement device comprising a fitting connected in line with a fluid line, the fitting having a fitting opening for receiving the flow restrictor and a receptacle for retaining the flow restrictor. The apparatus comprises a seal housing extending away from the fitting opening of the fitting, the seal housing being sealed to the fitting opening of the fitting. The seal housing has a housing opening spaced from the fitting opening of the fitting and a channel connecting the housing opening to the fitting opening. The seal housing comprises a first seal that seals the fitting opening, a second seal spaced from the first seal along the channel, and a third seal that seals the housing opening, the distance between the second seal and the third seal being greater than the height of the flow restrictor in the direction of the channel that seals the housing opening, each of the first, second and third seals being selectively retractable between an extended, sealing position that seals and blocks the channel and a retracted, open position that unseals and unblocks the channel. A bleeder valve is positioned between the first and second seals and between the second and third seals for equalizing pressure between the channel and an exterior pressure. A series of rotating drivers is spaced along the channel, the rotating drives engaging the flow restrictor and moving the flow restrictor along the channel between the receptacle in the fitting and the housing opening of the seal housing.

According to an aspect, the flow restrictor may be an orifice plate. The channel may be a longitudinal channel that is sized to receive the width and thickness of the orifice plate.

According to an aspect, at least the first seal and the second seal may be retracted using a rotating actuator.

According to an aspect, at least one of the first seal and the second seal may be locked in the sealed position by a releasable lock.

According to an aspect, each rotating driver may comprise a profile that engages a corresponding profile on the flow restrictor.

According to an aspect, the series of rotating drivers may comprise a first rotating driver positioned between the first seal and the fitting opening of the fitting, a second rotating driver positioned between the first seal and the second seal, and a third rotating driver positioned between the second seal and the third seal.

According to an aspect, the apparatus may further comprise a first equalizer valve for equalizing pressure across the first seal and a second equalizer valve for equalizing pressure across the second seal.

According to an aspect, the apparatus may further comprise pressure gauges between the first and second seals and between the second and third seals for measuring the pressure in the channel.

According to an aspect, the third seal may be a seal bar clamped by pin connectors at the housing opening of the seal housing.

According to an aspect, the flow restrictor may comprise an orifice plate carried by a plate carrier.

According to an aspect, there is provided a method of removing a flow restrictor from a differential pressure measurement device, the differential pressure measurement device comprising a fitting connected in line with a fluid line, the fitting having a receptacle retaining the flow restrictor and a fitting opening that provides access to the flow restrictor. The method comprises the steps of: providing a seal housing extending away from the fitting opening of the fitting, the seal housing being sealed to the fitting opening of the fitting and having a housing opening spaced from the fitting opening of the fitting and a channel connecting the housing opening to the fitting opening, the channel having a first seal, a second seal and a third seal spaced along the channel in a sealed position and a series of rotating drivers spaced along the channel; moving the first and second seals from the sealed position to an open, retracted position; moving the flow restrictor from the receptacle along the channel toward the third seal; moving the first and second seals to the sealed position and opening bleeder valves between the first and second seals and between the second and third seals to equalize the pressure in the channel and outside the channel; and opening the third seal and removing the flow restrictor from the channel.

According to an aspect, the method may further comprise the step of closing the second and third seals after removing the flow restrictor.

According to an aspect, the flow restrictor may be an orifice plate. The channel may be a longitudinal channel that is sized to receive the width and thickness of the orifice plate.

According to an aspect, at least one of the first seal and the second seal may be retracted and extended using a rotating actuator.

According to an aspect, the method may further comprise the step of releasing a releasable lock on at least one of the first seal and the second seal prior to retracting the respective seal from the sealed position.

According to an aspect, the rotating drivers comprise a profile that engages a corresponding profile on the flow restrictor.

According to an aspect, the series of rotating drivers may comprise a first rotating driver positioned between the first seal and the fitting opening of the fitting, a second rotating driver positioned between the first seal and the second seal, and a third rotating driver positioned between the second seal and the third seal.

According to an aspect, the method may further comprise the steps of opening a first equalizer valve that equalizes pressure across the first seal and a second equalizer valve that equalizes pressure across the second seal prior to opening the first and second seals According to an aspect, wherein opening the third seal may comprise releasing pin connectors that secure a seal bar at the housing opening of the seal housing.

According to an aspect, the method may further comprising reinstalling the flow restrictor by: moving the first and second seals to the sealed position; opening the third seal and inserting the flow restrictor into the channel; moving the flow restrictor down the channel past the third seal and closing the third seal; and opening the first and second seals and moving the flow restrictor into the receptacle of the fitting. The method may further comprise the step of opening a first equalizer valve that equalizes pressure across the first seal and a second equalizer valve that equalizes pressure across the second seal prior to opening the first and second seals prior to opening the first and second seals prior to moving the flow restrictor into the receptacle of the fitting.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

An apparatus 10 for installing and removing a flow restrictor from a differential pressure measurement device 100 and a method of removing and installing a flow restrictor will now be described with reference to FIG. 1 through 7.

Figure 2:
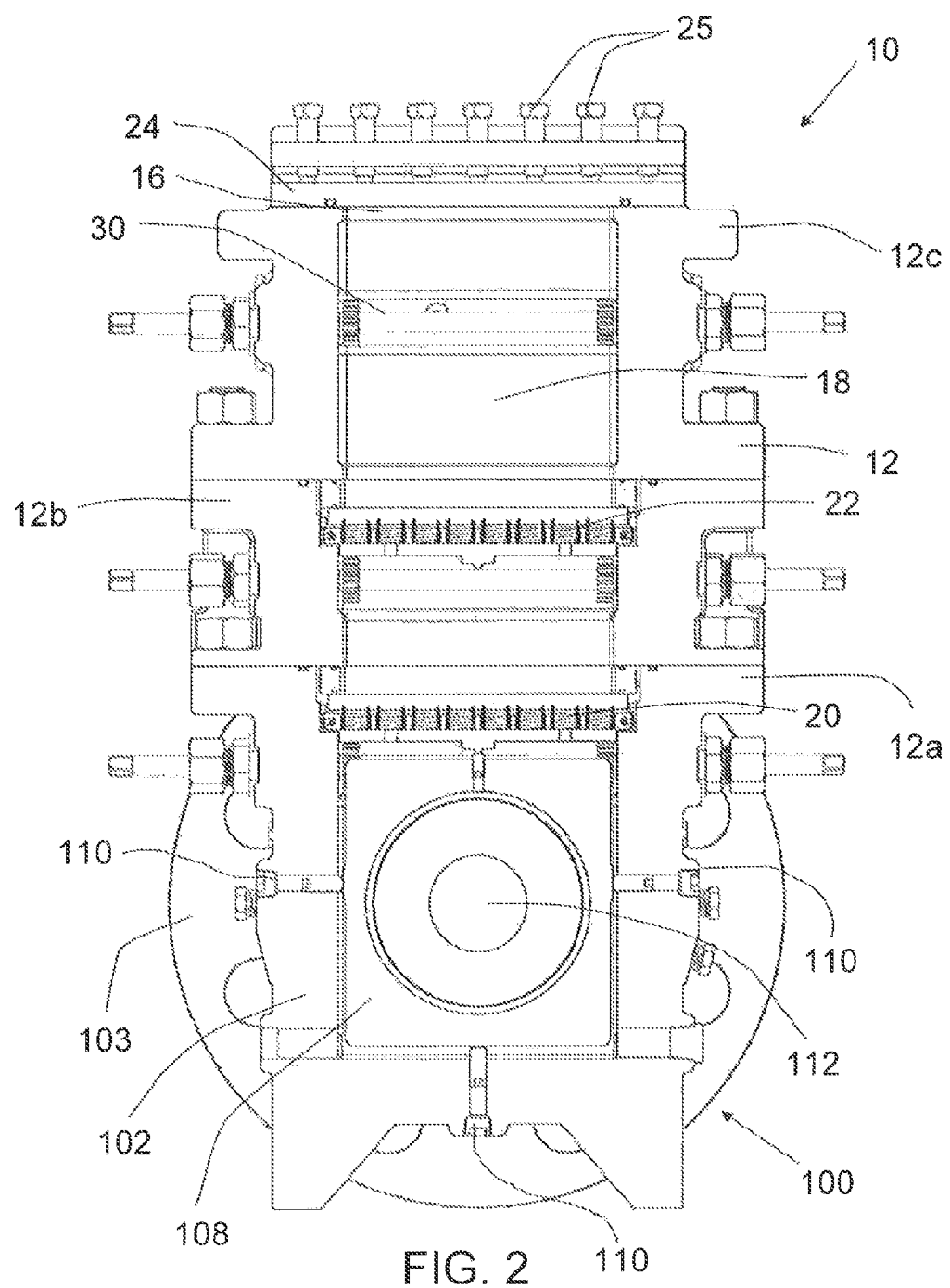
FIG. 2 is a side elevation view in section of the apparatus with the flow restrictor installed in a differential pressure measurement device.
Figure 3:
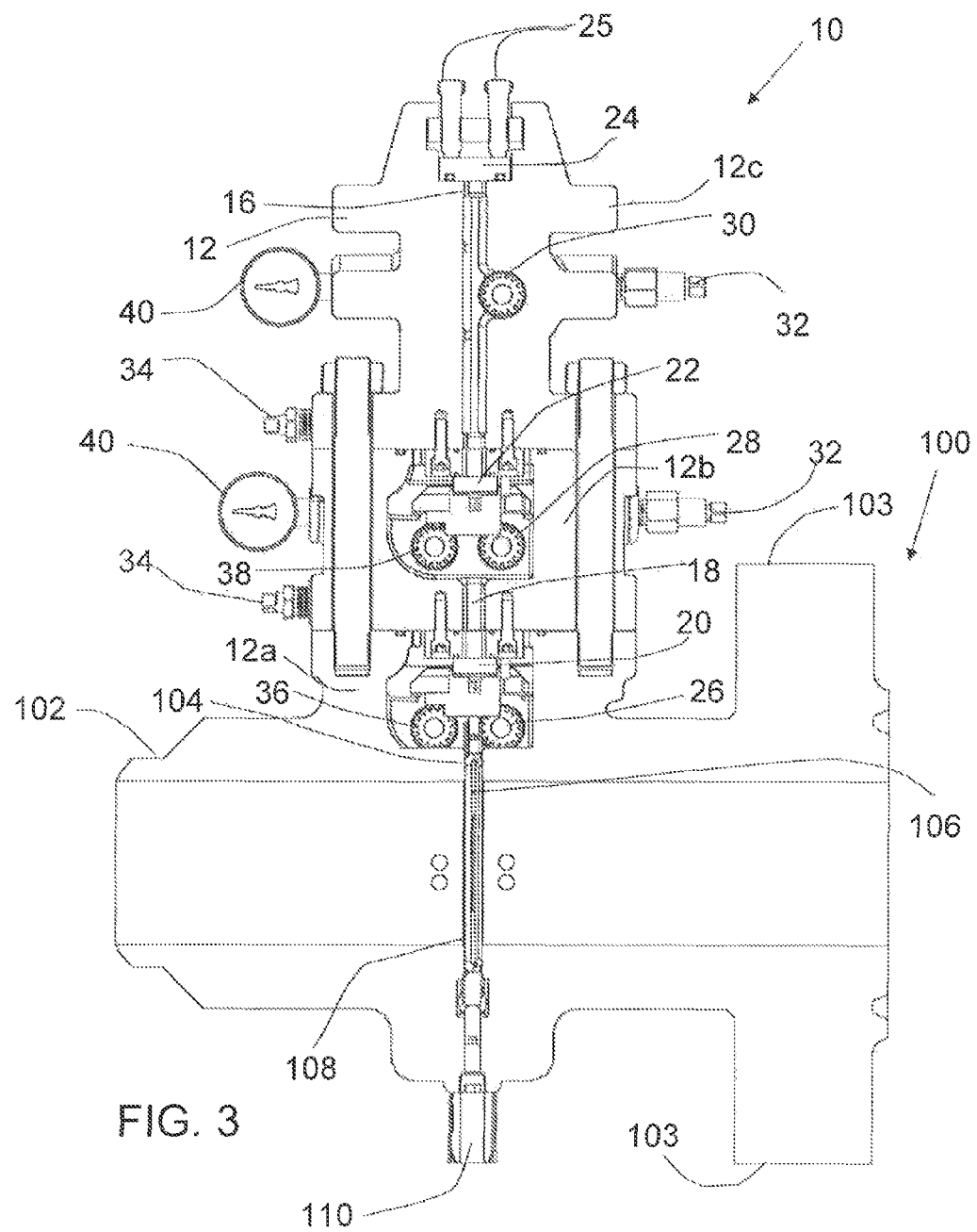
FIG. 3 is an end elevation view in section of the apparatus with the flow restrictor installed in a differential pressure measurement device.
Figure 4:
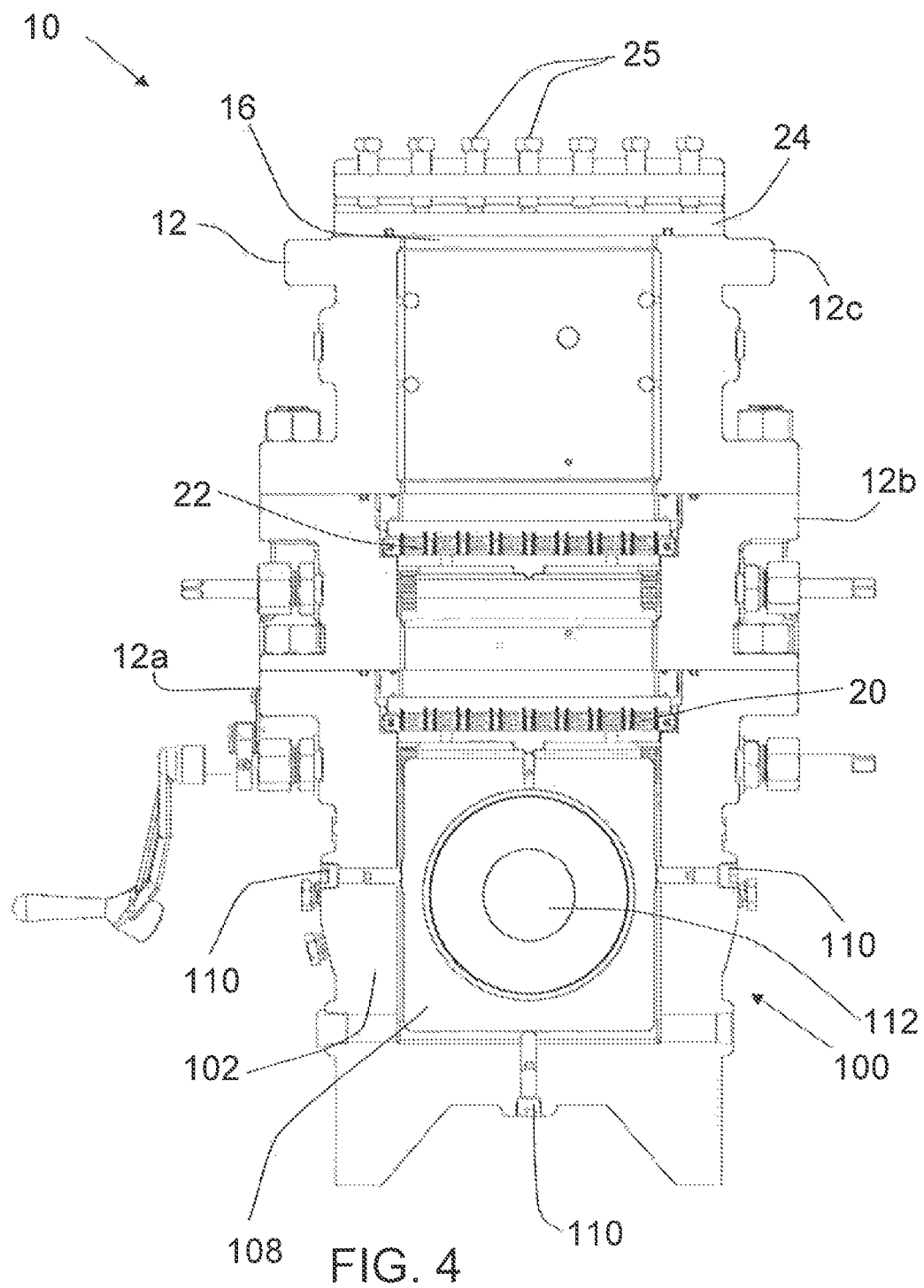
FIG. 4 is a side elevation view in section of the apparatus with the flow restrictor at the top of the channel and the lower two seals open.

Referring to FIGS. 2 and 3, differential pressure measurement device 100 has a fitting 102 connected in line with a fluid line (not shown). Fitting 102 is shown as having a flange 103 at one end to be attached to a fluid line. The manner in which fitting 102 may be installed with a fluid line is well known in the art and will not be described further. Fitting 102 has a fitting opening 104 for receiving a flow restrictor 106 and a receptacle 108 for retaining flow restrictor 106. Fitting opening 104 is located in the sidewall of fitting 102, such that flow restrictor 106 is inserted through fitting opening 104 in a direction that is perpendicular to the direction of flow through fitting 102. As can be seen, flow restrictor 106 is an orifice plate that is rectangular and that has an aperture 112. The plate of flow restrictor 106 is oriented perpendicular to the direction of flow through fitting 102, such that the flow passes through aperture 112. Flow restrictor 106 is held by receptacle 108 such that aperture 112 is preferably centered within the inner bore of fitting 102 and may be adjusted by alignment pins 110 set in fitting 102 to ensure aperture 112 is properly positioned. Aperture 112 results in a pressure differential across flow restrictor 106, which may then be used to calculate the flow rate through the fluid line as is known in the art. The various designs and uses of differential pressure measurement devices 100 are known in the art and will not be discussed further. While the present description relates to a common design, it will be understood that modifications to what is shown and described may be used.

Referring still to FIGS. 2 and 3, apparatus 10 includes a seal housing 12 that extends away from fitting opening 104 of fitting 102. Seal housing 12 is sealed to fitting opening 104 of fitting 102 and has a housing opening 16 spaced from fitting opening 104 of fitting 102. A channel 18 connects fitting opening 104 to housing opening 16. Preferably, channel 18 is a longitudinal channel that is sized to receive the width and thickness of the orifice plate, however it will be understood that channel 18 may be altered to accommodate different types of flow restrictors. As shown, seal housing 12 is actually made from three sections labelled 12a, 12b and 12c, where seal housing 12 is sealed to fitting opening 104 by integrally forming seal housing section 12a with fitting 102. Sections 12b and 12c are shows as being bolted together and onto section 12a. Alternatively, section 12a may be a separate piece and sealed to fitting opening 104 in another manner. Other modifications may be made by those skilled in the art.

Seal housing 12 has a first seal 20 that seals fitting opening 104, a second seal 22 spaced from first seal 20 along channel 18, and a third seal 24 that seals housing opening 16. Preferably, third seal 24 is a seal bar that is clamped by pin connectors 25 at housing opening 16 of seal housing 12. Third seal 24 can then be unclamped and removed from housing opening 16 to provide access to channel 18. As can be seen, the distance between first seal 20 and third seal 24 is greater than the height of flow restrictor 106, measured in the direction of channel 18, such that flow restrictor 106 may be isolated from atmosphere (or other external pressure if not working at atmospheric pressure) and from the pressure in fitting 102. This allows the pressure within channel 18 to be equalized to either atmosphere or to the pressure in fitting 102, depending on whether flow restrictor 106 is being installed or removed. Preferably, the distance between second seal 22 and third seal 24 is greater than the height of flow restrictor 106, which allows a double seal to be set prior to opening seal housing 12 to atmospheric pressure.

Figure 5:
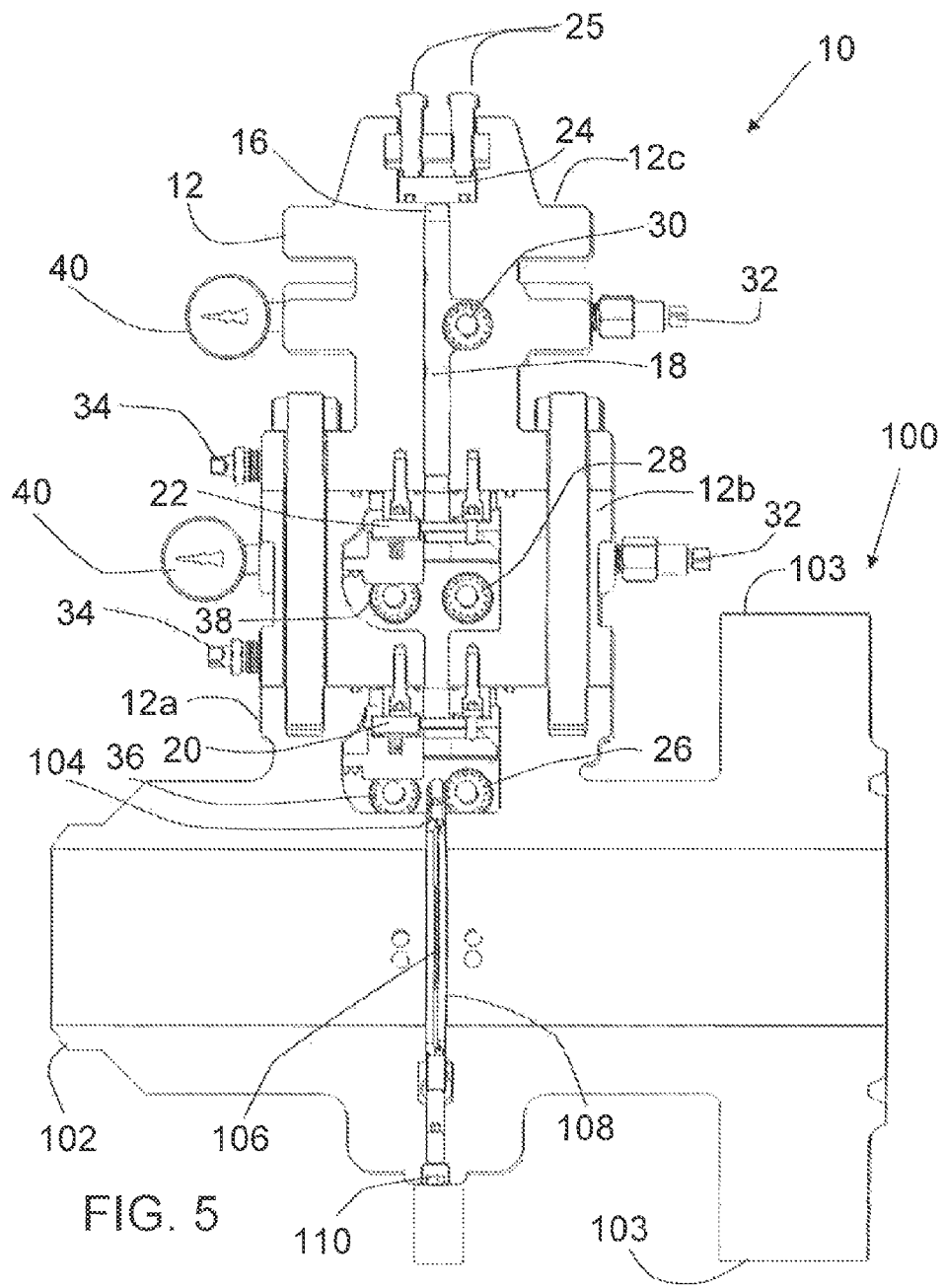
FIG. 5 is an end elevation view in section of the apparatus with the flow restrictor at the top of the channel and the lower two seals open.
Figure 6:
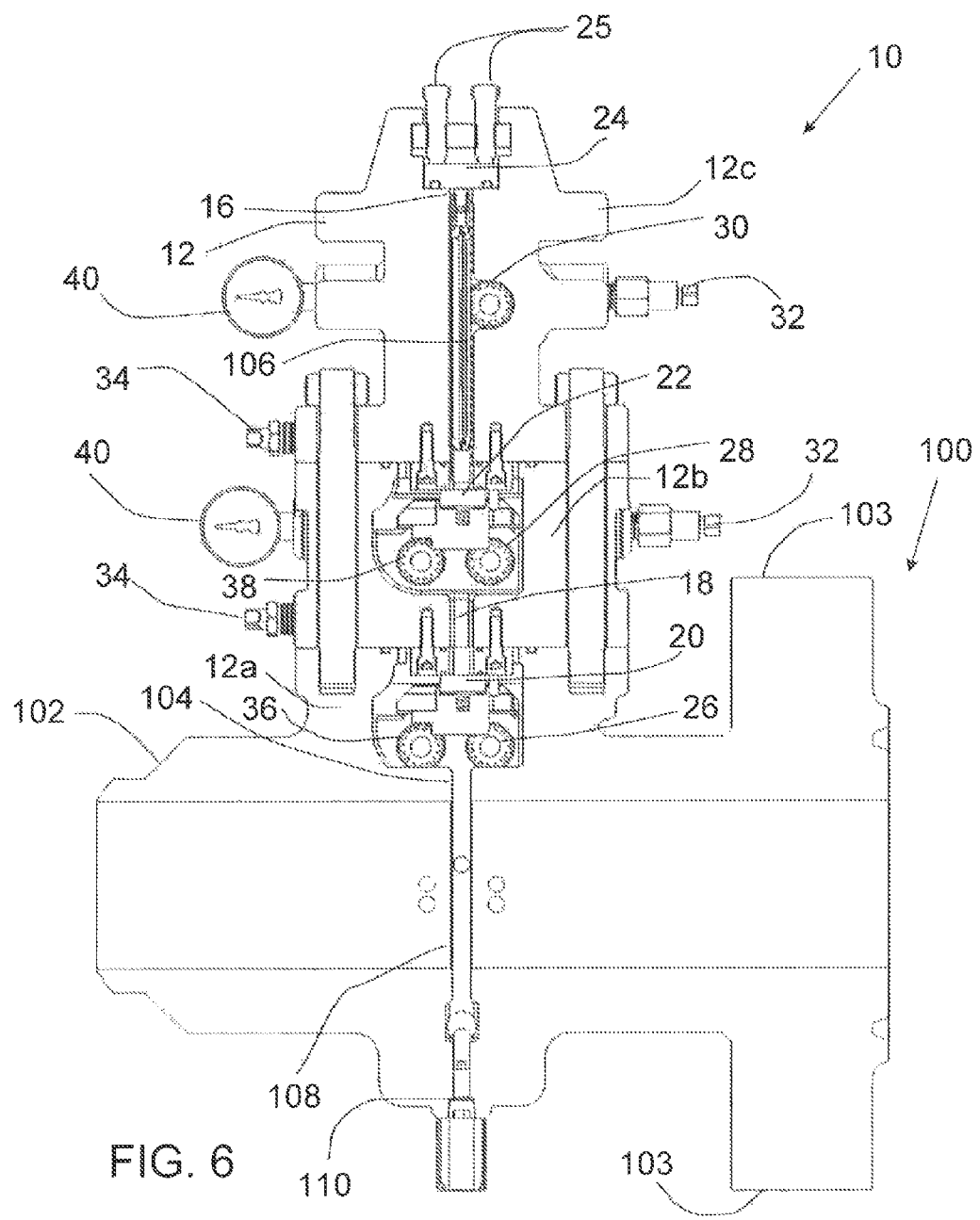
FIG. 6 is an end elevation view in section of the apparatus with the flow restrictor at the top of the channel and the lower two seals closed.
Figure 7:
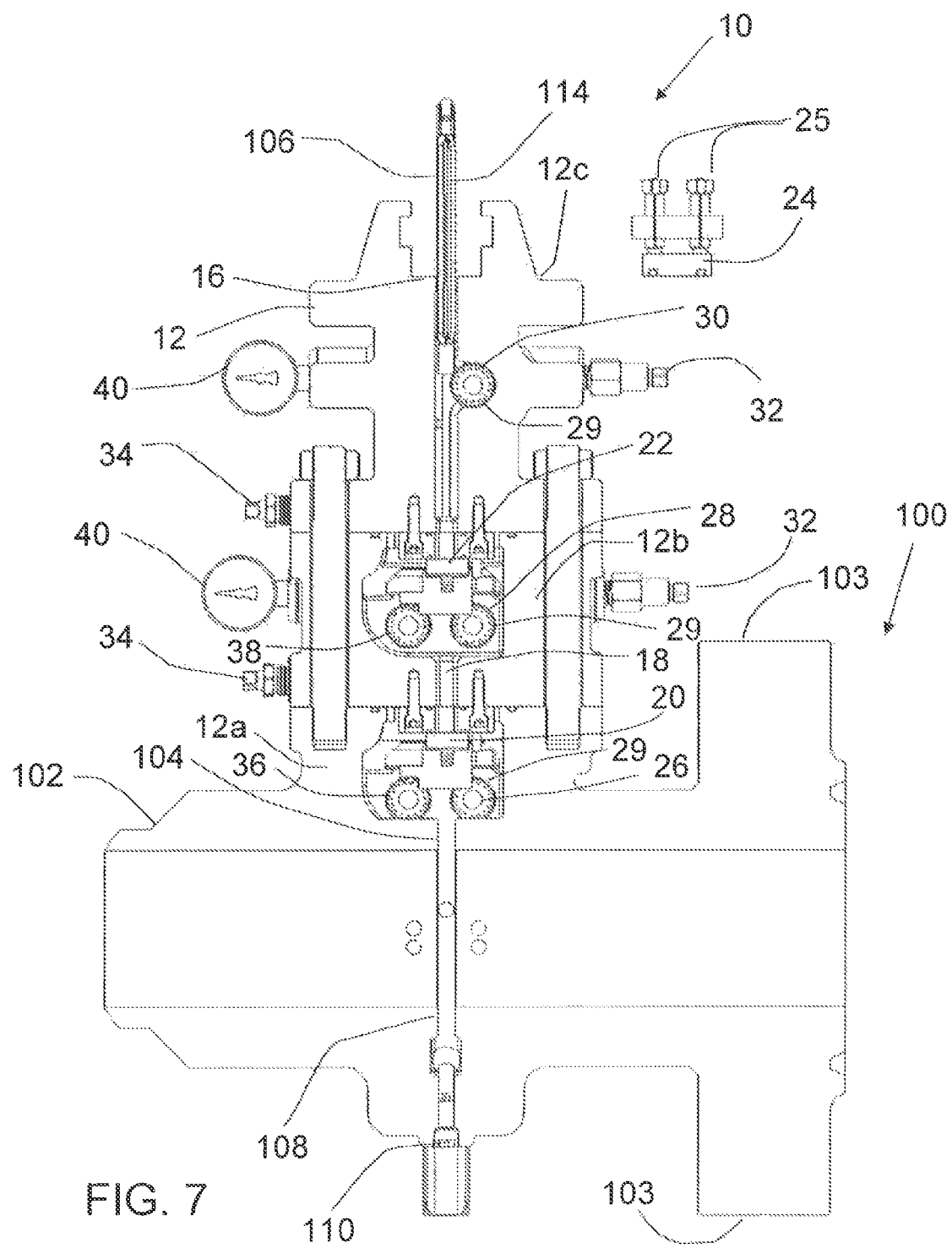
FIG. 7 is an end elevation view in section of the apparatus with the flow restrictor being removed.

As can be seen, each seal 20, 22 and 24 is selectively retractable between an extended, sealing position shown in FIG. 3 and retracted, open positions variously shown in FIG. 5-7 that unseals and unblock channel 18. In the unblocked positions, seals 20, 22 and 24 permit flow restrictor 106 to move along channel 18 unhindered by the respective seals. Preferably, first seal 20 and second seal 22 are retractable using rotating actuators 36 and 38, respectively. In order to prevent accidental movement of first seal 20, second seal 22 and third seal 24 a releasable lock 39 may lock seal 20, 22 or 24 in the sealed position. Multiple locks may be provided to enable each of first seal 20, second seal 22 and third seal 24 to be locked individually.

Figure 1:
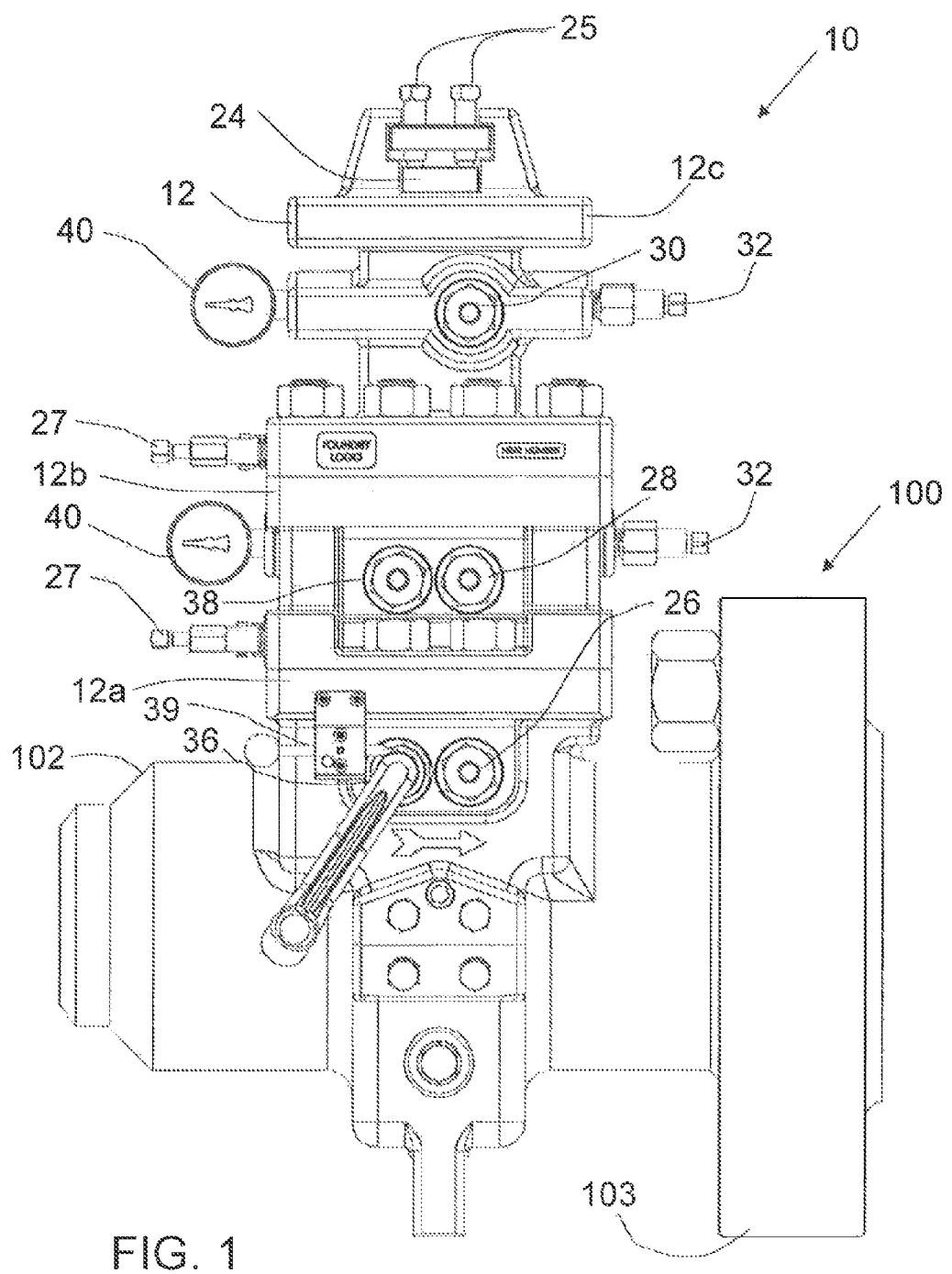
FIG. 1 is a side elevation view of the apparatus for installing and removing a flow restrictor from a differential pressure measurement device.

In one example, first seal 20 and second seal 22 may be sealed using a valve sealant grease compound injected by a grease gun 27 shown in FIG. 1. Valve sealant grease compound is injected through by the grease gun 27 and injected between the surfaces of a valve seat and valve strip where seals 20 and 22 reside. The grease gun 27 may not be necessary where elastomer o-rings are embedded into the valve seat.

In order to move flow restrictor 106 through channel 18, a series of rotating drivers are provided, and spaced along channel 18. As depicted, there is a first driver 26 positioned below first seal 20, a second driver 28 positioned between first and second seals 20 and 22, and a third driver 30 positioned between second and third seals 22 and 24. Drivers 26, 28 and 30 engage flow restrictor 106 in turn to move flow restrictor 106 along channel 18 between receptacle 108 in fitting 102 and housing opening 16 of seal housing 12. Referring to FIG. 7 in the embodiment shown, each of first driver 26, second driver 28 and third driver 30 have a profile 29 that engages a corresponding profile 114 on flow restrictor 106. Although these corresponding profiles 29 and 114 are useful in moving flow restrictor 106 through channel 18, it will be understood that flow restrictor 106 may be gripped in other ways.

Channel 18 may be considered to be the space along which flow restrictor 106 passes, or in other words, the opening provided by seals in the open position and the plate carriers. While in some examples the physical dimensions of the channel may be larger at certain points above or below each respective seal or plate carrier, the channel itself may be considered the space required to move the flow restrictor. As can be seen, housing opening 16 is preferably directly in line with channel 18 and seal opening 104, such that flow restrictor 106 moves directly from an installed position to a removed position.

Referring to FIG. 3, bleeder valves 32 and equalizer valves 34 are preferably used to equalize the pressure as flow restrictor 106 passes through seal housing 12. As shown, there is a bleeder valve 32 in fluid communication with the compartment formed by first seal 20 and second seal 22, as well as a bleeder valve 32 in communication with the compartment formed by second seal 22 and third seal 24. Bleeder valves 32 allow the pressure in seal housing 12 held by the respective seals to be slowly released prior to opening third seal 24. As shown, equalizer valves 34 are provided in conjunction with first and second seals 20 and 22. These valves permit pressure to be equalized across each seal 20 and 22, such that when they are opened, the risk of damage due to a pressure differential or sudden pressure drop is reduced. These valves equalize the pressure across the respective seal when flow restrictor 106 is being installed. For example, equalizer valve 34 carried by first seal 20 may be opened to equalize the pressure between first and seconds seals 20 and 22 or first and third seals 20 and 24 with the pressure in fitting 102 prior to opening first seal 20. Pressure gauges 40 are preferably incorporated to measure the pressure in channel 18. Preferably, a pressure gauge be positioned to measure the pressure in the compartment formed by first seal 20 and second seal 22 and a second pressure gauge 40 positioned to measure the pressure in the compartment formed by second seal 22 and third seal 24.

The triple chamber orifice fitting provides the operator with a second layer of safety over the dual chamber orifice fitting during the inspection and/or removal of the orifice plate. While the operator has the top chamber open to atmosphere for access to the orifice plate, the pressure is being blocked by the lower inner valve. Should this lower valve leak, with the mid chamber bleeder valve open, the pressure can build up stopping the possibility of a leak into the upper chamber. As can be seen, when the seal bar 24 is removed to remove the flow restrictor 106, the first seal 20 and the second seal 22 are closed and the bleeder valve 32 in the compartment created between first seal 20 and second seal 22 is open to bleed off any leaking through bleeder valve 32. This reduces or removes the risk of gas pressure leaking to the compartment created between second seal 22 and third seal 24. The bleeder valve 32 may be open to atmosphere or to a fluid reservoir with a lower pressure. Either of these may be considered an external pressure. This design protects the operator during orifice plate removal against coming into contact with any gas pressure release.

An example of the operation of apparatus 10 will now be described with reference to FIG. 1 through 7. The steps outlined below are given as an example of a safe method, based on the design of the example shown in the drawings. It will be understood that the operation may be modified based on the preferences of the user and the particular design of apparatus 10.

Apparatus 10 is in normal operation when, as shown in FIGS. 1 and 2, orifice plate is concentric in the flow line, both the lower and upper inner valves are closed, the two equalizer valves are closed, the bleeder valves are closed, the middle and upper chambers are depressurized and the lower chamber is pressurized. Flow of the gas or liquid passing through the orifice plate creates the differential pressure which is measured and used for the calculation of the flow rate through the pipe line.

As will be discussed below, flow restrictor 106 is made up of an orifice plate carried by a plate carrier, which has a seal that engages receptacle 108. These features are not identified in the drawings in great detail, but are well known to those of ordinary skill. As will be understood, drivers 26, 28 and 30 preferably engage the plate carrier rather than the plate itself.

To remove the flow restrictor 106 under pressure:
1. Insure that the third seal 24, also referred to as a top seal bar, is clamped firmly in place and that the bleeder valves 32 are both closed.
2. Open the lower equalizer valve 40 to equalize the pressure into the mid chamber (formed by first seal 20 and second seal 22) and then open the upper equalizer valve 40 to equalize the pressure to the top chamber (formed by second seal 22 and third seal 24).
3. Open both first seal 20 and second seal 22. Should the unit be equipped with the valve lock-out mechanisms 39, it will be required to pull the lock-out handle downward in order to enable rotation of the rotating actuators 36 and 38 to move first seal 20 and second seal 22 to the open position)
4. Starting with the first driver 26, rotate to move the flow restrictor 106 up until it engages the second driver 28. Rotate the second driver 28 until the flow restrictor 106 engages the third driver 30. Rotate the third driver 30 until the flow restrictor 106 stops against third seal 24, or top seal bar. As shown, drivers 26, 28 and 30 are operating gears, and are positioned within the chambers defined by the seals as described above.
5. Rotate the rotating actuators 36 and 38 to move first seal 20 and second seal 22 back to the closed position.
6. Close both equalizer valves 40.
7. Open the bleed valve 32 on the top chamber formed by second seal 22 and third seal 24 to fully depressurize the top chamber.
8. Open the bleed valve 32 on the mid chamber formed by first seal 20 and second seal 22 to depressurize the mid chamber.
9. Loosen the top clamp bar screws 25 and rotate third driver 30 to dislodge the seal bar 24.

10. Remove both the clamp bar and seal bar 24. Rotate the flow restrictor 106 upwards through the opening 16 for access.

To re-insert the flow restrictor 106 including the orifice plate:
  1. Insure that flow restrictor 106 is properly configured with the orifice plate and seal in the plate carrier with the plate seal facing the downstream and the sharp edge of the orifice plate facing the upstream.
  2. Insert the flow restrictor 106 into the open top slot 16 of the orifice fitting with the gear surface facing the downstream insuring that it sits squarely on the top operator gears and is parallel to the top surface of the housing 12.
  3. Rotate the third driver 30 until the flow restrictor 106 clears the top seal bar of third seal 24. Reinstall the seal bar and clamp bar of third seal 24 insuring that they are centered and that the clamp bar screws 25 are securely tightened.
  4. Close the bleeder valves 32 on both the mid chamber formed by first seal 20 and second seal 22 and top chamber formed by second seal 22 and third seal 24.
  5. Slowly open the equalizer valve 40 in the mid chamber formed by first seal 20 and second seal 22 to pressure up the mid chamber formed by first seal 20 and second seal 22 equal to the channel 18 pressure.
  6. Slowly open the equalizer valve 40 in the top chamber formed by second seal 22 and third seal 24 to pressure up the top chamber formed by second seal 22 and third seal 24 equal to the channel 18 pressure.
  7. Open the first seal 20 and the second seal 22 with the corresponding rotating actuators 36 and 38. (Should the unit be equipped with the valve lock-out mechanisms, it will be required to pull the lock-out handle downward to enable rotation of the valve operators to the open position)
  8. Starting with the third driver 30, rotate until the flow restrictor 106 engages the second driver 28. Rotate the second driver 28 until the flow restrictor 106 engages the first driver 26. Rotate the first driver 26 until the flow restrictor 106 stops against the lower alignment pin 110.
  9. Close both equalizer valves 40 and move both first seal 20 and second seal 22 to the closed position.
  10. Open the bleeder valves 32 to depressurize the upper formed by second seal 22 and third seal 24 and mid chambers formed by first seal 20 and second seal 22 and then re-close the bleeder valves 32. The unit is now in the operational state.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. The scope of the claims should not be limited by the preferred embodiments set forth in the examples above.

What is claimed is:

1. An apparatus for installing and removing a flow restrictor from a differential pressure measurement device, the differential pressure measurement device comprising a fitting connected in line with a fluid line, the fitting having a fitting opening for receiving the flow restrictor and a receptacle for retaining the flow restrictor, the apparatus comprising:
  a seal housing extending away from the fitting opening of the fitting, the seal housing being sealed to the fitting opening of the fitting, the seal housing having a housing opening spaced from the fitting opening of the fitting, and a channel connecting the housing opening to the fitting opening, the seal housing comprising:
    a first seal that seals the fitting opening, a second seal spaced from the first seal along the channel, and a third seal that seals the housing opening, the distance between the second seal and the third seal being greater than the height of the flow restrictor in the direction of the channel that seals the housing opening, each of the first, second and third seals being selectively retractable between an extended, sealing position that seals and blocks the channel and a retracted, open position that unseals and unblocks the channel;
    a bleeder valve positioned between the first and second seals and a bleeder valve positioned between the second and third seals for equalizing pressure between the channel and an exterior pressure;
    a series of rotating drivers spaced along the channel, the rotating drivers engaging the flow restrictor and moving the flow restrictor along the channel between the receptacle in the fitting and the housing opening of the seal housing.

2. The apparatus of claim 1, wherein the flow restrictor is an orifice plate.

3. The apparatus of claim 2, wherein the channel is a longitudinal channel that is sized to receive the width and thickness of the orifice plate.

4. The apparatus of claim 1, wherein at least the first seal and the second seal are retracted using a rotating actuator.

5. The apparatus of claim 1, wherein at least one of the first seal and the second seal are locked in the sealed position by a releasable lock.

6. The apparatus of claim 1, wherein each rotating driver comprises a profile that engages a corresponding profile on the flow restrictor.

7. The apparatus of claim 1, wherein the series of rotating drivers comprises a first rotating driver positioned between the first seal and the fitting opening of the fitting, a second rotating driver positioned between the first seal and the second seal, and a third rotating driver positioned between the second seal and the third seal.

8. The apparatus of claim 1, comprising a first equalizer valve for equalizing pressure across the first seal and a second equalizer valve for equalizing pressure across the second seal.

9. The apparatus of claim 1, further comprising pressure gauges between the first and second seals and between the second and third seals for measuring the pressure in the channel.

10. The apparatus of claim 1, wherein the third seal is a seal bar clamped by pin connectors at the housing opening of the seal housing.

11. The apparatus of claim 1, wherein the flow restrictor comprises an orifice plate carried by a plate carrier.

12. A method of removing a flow restrictor from a differential pressure measurement device, the differential pressure measurement device comprising a fitting connected in line with a fluid line, the fitting having a receptacle retaining the flow restrictor and an fitting opening that provides access to the flow restrictor, the method comprising the steps of:

providing a seal housing extending away from the fitting opening of the fitting, the seal housing being sealed to the fitting opening of the fitting, the seal housing having a housing opening spaced from the fitting opening of the fitting, and a channel connecting the housing opening to the fitting opening, the channel having a first seal, a second seal and a third seal spaced along the channel in a sealed position and a series of rotating drivers spaced along the channel;

moving the first and second seals from the sealed position to an open, retracted position;

moving the flow restrictor from the receptacle along the channel toward the third seal;

moving the first and second seals to the sealed position and opening bleeder valves between the first and second seals and between the second and third seals to equalize the pressure in the channel and outside the channel; and opening the third seal and removing the flow restrictor from the channel.

13. The method of claim 12, further comprising the step of closing the first and second seals after moving the flow restrictor toward the third seal.

14. The method of claim 12, wherein the flow restrictor is an orifice plate.

15. The method of claim 14, wherein the channel is a longitudinal channel that is sized to receive the width and thickness of the orifice plate.

16. The method of claim 12, wherein at least one of the first seal and the second seal are retracted and extended using a rotating actuator.

17. The method of claim 12, further comprising the step of releasing a releasable lock on at least one of the first seal and the second seal prior to retracting the respective seal from the sealed position.

18. The method of claim 12, wherein the rotating drivers comprise a profile that engages a corresponding profile on the flow restrictor.

19. The method of claim 12, wherein the series of rotating drivers comprises a first rotating driver positioned between the first seal and the fitting opening of the fitting, a second rotating driver positioned between the first seal and the second seal, and a third rotating driver positioned between the second seal and the third seal.

20. The method of claim 12, further comprising the steps of opening a first equalizer valve that equalizes pressure across the first seal and a second equalizer valve that equalizes pressure across the second seal prior to opening the first and second seals.

21. The method of claim 12, wherein opening the third seal comprises releasing pin connectors that secure a seal bar at the housing opening of the seal housing.

22. The method of claim 12, further comprising reinstalling the flow restrictor by:

moving the first and second seals to the sealed position;

opening the third seal and inserting the flow restrictor into the channel;

moving the flow restrictor down the channel past the third seal and closing the third seal; and opening the first and second seals and moving the flow restrictor into the receptacle of the fitting.

23. The method of claim 22, further comprising the step of opening a first equalizer valve that equalizes pressure across the first seal and a second equalizer valve that equalizes pressure across the second seal prior to opening the first and second seals prior to opening the first and second seals prior to moving the flow restrictor into the receptacle of the fitting.

* * * * *